United States Patent
Rodriguez Bravo et al.

(10) Patent No.: US 12,556,532 B2
(45) Date of Patent: Feb. 17, 2026

(54) SYSTEM AND METHOD TO DETECT AND PREVENT KEYLOGGING ATTACKS

(71) Applicant: Kyndryl, Inc., New York, NY (US)

(72) Inventors: Cesar Augusto Rodriguez Bravo, Alajuela (CR); Kim A. Eckert, Austin, TX (US)

(73) Assignee: Kyndryl, Inc., New York, NY (US)

( * ) Notice: Subject to any disclaimer, the term of this patent is extended or adjusted under 35 U.S.C. 154(b) by 105 days.

(21) Appl. No.: 18/400,092

(22) Filed: Dec. 29, 2023

(65) Prior Publication Data
US 2025/0220013 A1 Jul. 3, 2025

(51) Int. Cl.
*H04L 9/40* (2022.01)

(52) U.S. Cl.
CPC ........ *H04L 63/083* (2013.01); *H04L 63/1416* (2013.01); *H04L 2463/082* (2013.01)

(58) Field of Classification Search
CPC ............... H04L 63/083; H04L 63/1416; H04L 2463/082
See application file for complete search history.

(56) References Cited

U.S. PATENT DOCUMENTS

| | | | |
|---|---|---|---|
| 10,089,468 B2 | 10/2018 | Adams et al. | |
| 11,042,624 B2 | 6/2021 | Rodriguez Bravo et al. | |
| 11,438,378 B1 * | 9/2022 | Dell'Amico | H04L 9/3236 |
| 11,457,009 B2 * | 9/2022 | Wright | H04L 63/1491 |
| 12,032,726 B1 * | 7/2024 | Tas | G06F 21/83 |
| 2017/0324726 A1 * | 11/2017 | Alleaume | H04W 12/33 |
| 2017/0344744 A1 | 11/2017 | Adams et al. | |
| 2019/0080060 A1 * | 3/2019 | Lee | H04L 63/083 |
| 2020/0201975 A1 | 6/2020 | Rodriguez Bravo et al. | |
| 2021/0216644 A1 | 7/2021 | Soman et al. | |
| 2022/0292179 A1 | 9/2022 | Fisher-Stawinski et al. | |

OTHER PUBLICATIONS

Mell et al., "The NIST Definition of Cloud Computing", NIST, Special Publication 800-145, Sep. 2011, 7 pages.
Unknown, "DuckyScript™ Quick Reference" https://docs.hak5.org/hak5-usb-rubber-ducky/duckyscript-tm-quick-reference, accessed Dec. 28, 2023, 35 pages.
Unknown, "Keystroke Injection", https://docs.hak5.org/hak5-usb-rubber-ducky/ducky-script-basics/keystroke-injection, accessed Dec. 28, 2023, 26 pages.
Unknown, "How to Prevent Keylogger Threats", Microsoft 365, https://www.microsoft.com/en-us/microsoft-365-life-hacks/privacy-and-safety/what-is-a-keylogger, Jul. 12, 2022, 7 pages.
Gavin Phillips, "5 Ways to Protect Yourself Against Keyloggers", https://www.makeuseof.com/tag/4-ways-protect-keyloggers/, Make Use Of, Published Jul. 31, 2018, 12 pages.
Unknown, "http://dewasoft.com/privacy/kldetector.htm", KL-Detector v1.3 accessed Dec. 28, 2023, 5 pages.

* cited by examiner

*Primary Examiner* — Gil H. Lee
(74) *Attorney, Agent, or Firm* — Erik Swanson; Andrew M. Calderon; Calderon Safran & Wright P.C.

(57) ABSTRACT

In an first aspect of the disclosure, there is a computer-implemented method which includes: obtaining, by a computing device, a password entered by an account user, placing, by the computing device, the password in memory of a device; generating, by the computing device, a fake password by randomly injecting characters into the password; storing, by the computing device, the fake password in a secure database; and deleting the password from the memory.

20 Claims, 7 Drawing Sheets

| Layer 4 (715) | Software Layer (including malware) |
|---|---|
| Layer 3 (710) | Driver Layer |
| Layer 2 (705) | Operating System Layer |
| Layer 1 (700) | Hardware Layer |

SYSTEM AND METHOD TO DETECT AND PREVENT KEYLOGGING ATTACKS

BACKGROUND

Aspects of the present invention relate generally to cybersecurity and, more particularly, to a system and method to detect and prevent keylogging attacks.

A keylogger is a form of malware or hardware that keeps track of and records a user's keystrokes as they type on a device. These devices may be cellular telephones, laptops, notepads or other electronic devices. The keystroke information may be sent to a hacker using a command-and-control (C&C) server, as an example, which can then be used for malicious purposes. For example, using the keystroke information, the attacker can recover usernames, passwords, credit card information, and other sensitive information.

There are several types of keylogging attacks. These attacks include, for example, key sniffing, hardware based attacks and software keylogging attacks. In a key sniffing attack, the attacker can capture keystrokes when transferred from the keyboard to a wireless dongle. In this way, keystroke sniffing enables an attacker to eavesdrop on every keystroke a victim types on their device from several hundred feet away. A hardware based attack may include a USB device connected to the device that captures the keystrokes in real time. A software attack may be a type of malware that captures the keystrokes and exfiltrates them to the attacker's device.

By way of example, a keylogger attack may target unsecured Wi-Fi which prompts users to unknowingly download malicious software. Once downloaded, the malicious software acts as a keylogger and reports keystrokes to the hackers. After a certain number of recorded keystrokes, the malicious software deletes itself from the device. In this way, the malicious software does not remain on a device for too long and can thus avoid detection. By using the malicious software, cybercriminals can understand more about their victim to help guide a sophisticated attack. For example, social engineering strategies are more successful when cybercriminals use personal and business information to gain the victim's trust.

SUMMARY

In a first aspect of the invention, there is a computer-implemented method including: obtaining, by a computing device, a password entered by an account user; placing, by the computing device, the password in memory of a device; generating, by the computing device, a fake password by randomly injecting characters into the password; storing, by the computing device, the fake password in a secure database; and deleting the password from the memory.

In another aspect of the invention, there is a computer program product including one or more computer readable storage media having program instructions collectively stored on the one or more computer readable storage media. The program instructions are executable to: detect a login screen of a user's account; monitor keystrokes of a password entered into the login screen; monitor keystrokes of a virtual keyboard; generate a fake password by randomly injecting the monitored keystrokes of the virtual keyboard into the password; store the fake password in a secure database; compare a second password entered into the login screen of the user's account against the fake password; and provide a security action when the second password matches the fake password.

In another aspect of the invention, there is system including a processor, a computer readable memory, one or more computer readable storage media, and program instructions collectively stored on the one or more computer readable storage media. The program instructions are executable to: monitor keystrokes of a password entered into a login screen of a user's account; generate a fake password by randomly injecting the keystrokes from a virtual keyboard into the password; store the fake password in a secure database; compare a second password entered into the login screen of the user's account against the fake password; and provide a security action when the second password matches the fake password.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
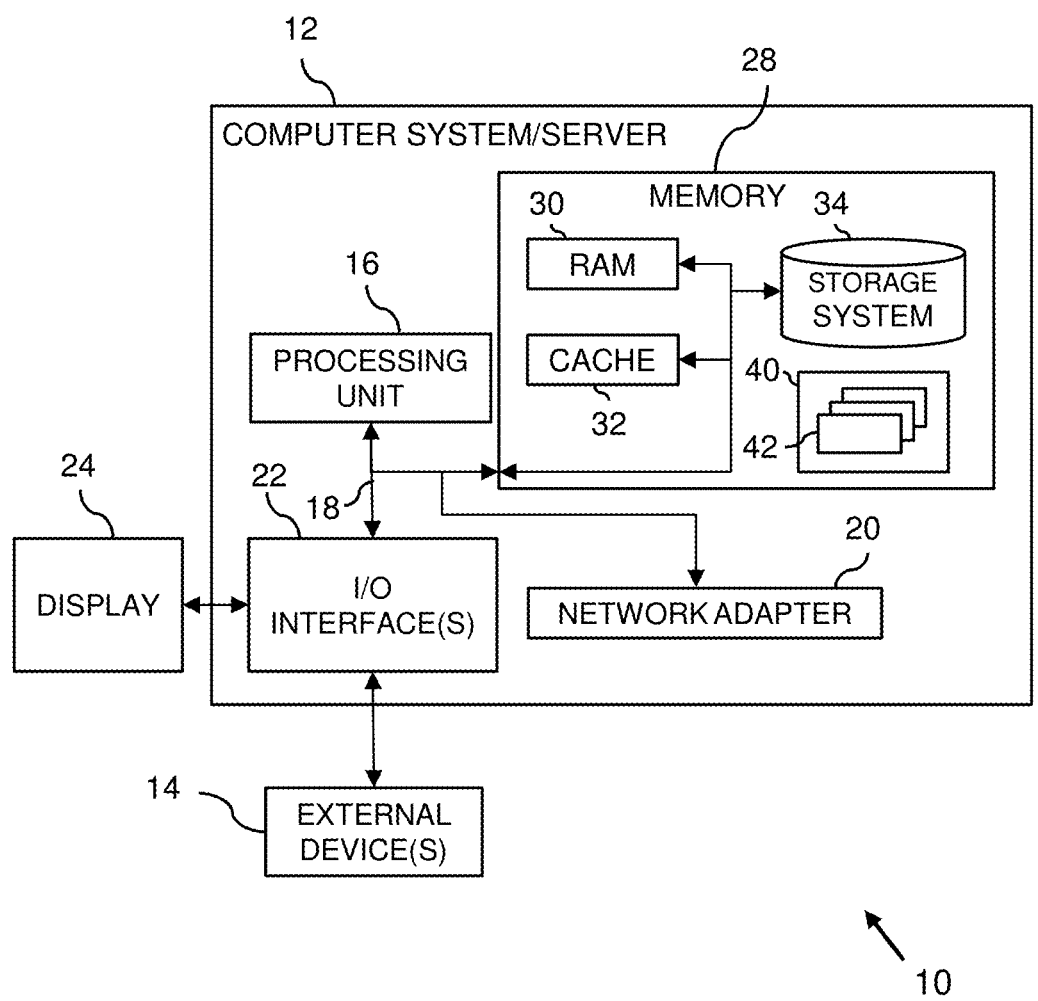
FIG. 1 depicts a cloud computing node according to an embodiment of the present invention.

Aspects of the present invention relate generally to cybersecurity and, more particularly, to a system and method to detect and prevent keylogging attacks. According to aspects of the invention, the system and method can thwart attacks from keystroke logging software by generating fake passwords that are passed along to a malicious user (e.g., hacker). The subsequent use of the fake password to login to a user's account will be detected and will immediately trigger a security action, e.g., account lock, thereby preventing a hacker from accessing the user's account. The system and/or method can be implemented as a computer program product which detects and prevents the keylogging attacks.

The system, method and computer program product provide a technical feature (e.g., technical solution) to a technical problem of detecting and thwarting malicious activity on a computing device, e.g., keylogging attacks. The system, method, and computer program product, for example, also integrate a practical and significant application to detect and prevent keylogging attacks. By way of example, the system, method and computer program detect keylogging attacks by generating (e.g., creating) a fake password, providing the fake password to a hacker, e.g., malicious user, and, upon the hacker logging into a user's account (e.g., application, device, system, etc.) with the fake password, recognizing the fake password and immediately stopping the keylogging attack. Also, once the fake password is detected, the system, method and computer program can alert the user and/or administrator of the attack allowing further investigation to uncover the hacker, e.g., malicious user, and/or malicious software. Accordingly, it is possible to thwart an attack without any concern that the password being used by the hacker would even be able to access any of the user's accounts. Also, advantageously, the system, method, and computer program product detect a security threat in real-time, which leads to added security and reduced fraudulent activity.

In more specific embodiments, the system, method, and computer program product can thwart an attack by, for example, creating a virtual human interface driver I/O monitor to inject a random series of keystrokes when a user is typing a password or other login information into a login field of a user's account. These random series of keystrokes will be used to generate a fake or obfuscated password, which is saved in a secure database and passed to the hacker. The real password, on the other hand, remains in physical, short term memory of the computing device and is injected into the login field of a user's account. The real password can be erased from the physical, short term memory with the related processes to permanently remove the real password, without it ever reaching or being uncovered by the malicious software. In fact, as the fake or obfuscated password is generated at an abstraction layer lower than an abstraction layer in which the malicious software resides, it will be impossible for the malicious software to ever determine or detect that a fake of obfuscated password was generated and provided to the hacker, e.g., that the fake or obfuscated password is not authentic. In implementation, when a login attempt is detected using the fake or obfuscated password, the system will flag the machine or system as compromised and execute a security action such as an account lock or a request for multifactor authentication.

It should be understood that, to the extent implementations of the invention collect, store, or employ personal information provided by, or obtained from, individuals (for example, passwords and usernames) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
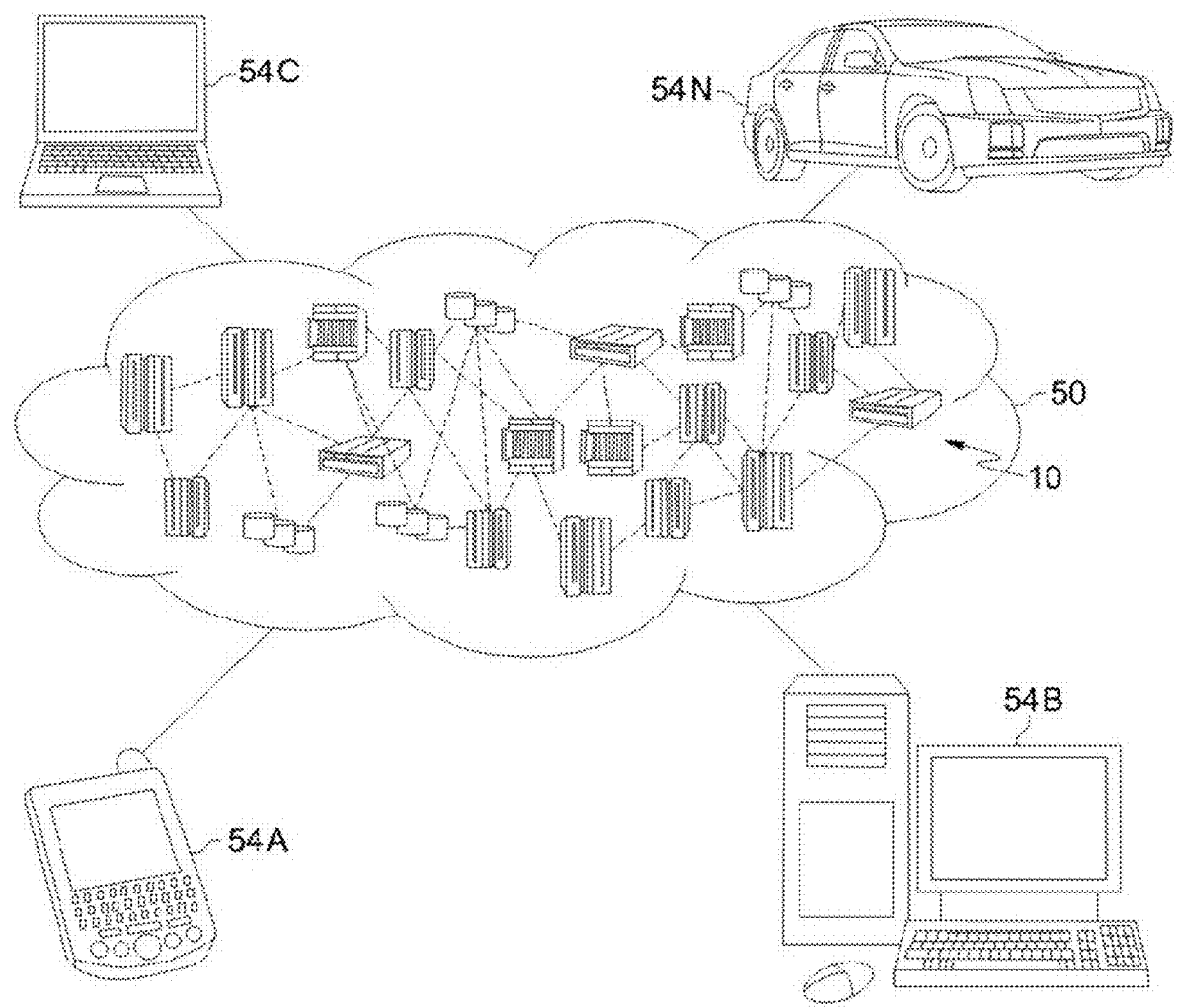
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
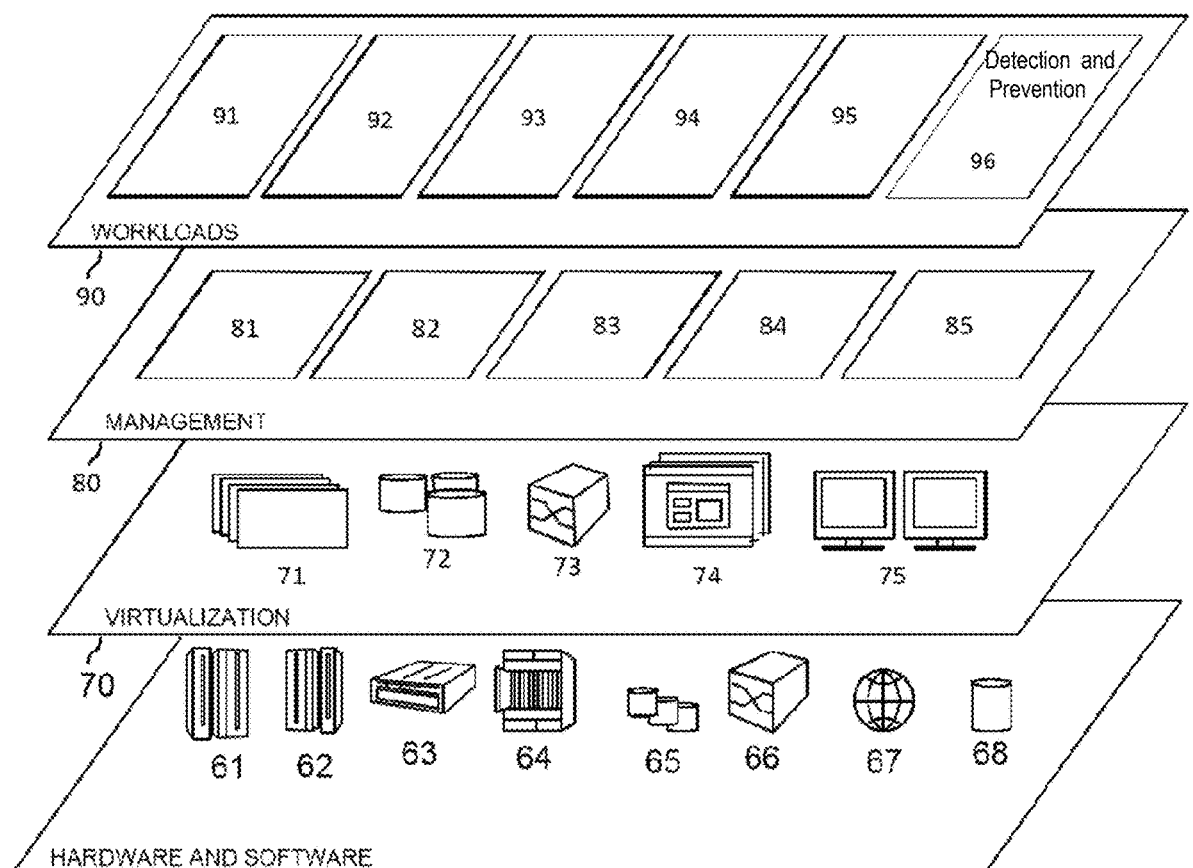
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and detection and prevention 96.

Implementations of the invention may include a computer system/server 12 of FIG. 1 in which one or more of the program modules 42 are configured to perform (or cause the computer system/server 12 to perform) one of more functions of the detection and prevention 96 of FIG. 3. For example, the one or more of the program modules 42 may be configured to detect a login screen of a user's account. In embodiments, the user's account can be any application, e.g., web application, password secured document, etc. The login screen can be detected by leveraging any known technique such as windows kernels, windows calls to an authentication system, e.g., LDAP, etc., windows development tools or a prompt on a web based application, as a few examples. The user's account can be accessed by the user's device or other device such as a server or other computing device as shown in FIG. 1 or described with respect to FIGS. 2 and 3.

Once the login screen is detected, a virtual human interface driver (HID) keyboard, as implemented herein, will inject random characters into the user's password, thereby generating a fake or obfuscated password. In this way, any malicious keylogging software will see the keystrokes (e.g., fake or obfuscated password) which are randomly generated by the virtual HID keyboard. The fake or obfuscated password can be saved in a secure database, e.g., storage system 34 of FIG. 1. On the other hand, the real password is recorded in physical, short term memory and injected into the login field of a user's account, e.g., of the login screen. The real password can subsequently be deleted from the physical, short term memory with any related processes, e.g., the login screen. In this way, there will be no trace of the real password on the user's device. Upon subsequent use of the fake or obfuscated password by a hacker, the program module(s) 42 of the detection and prevention 96 can detect the use of the fake or obfuscated password and provide a security action, e.g., lock down the device.

As used herein, physical, short term memory is primary memory of the computing device. This primary memory may include Random Access Memory (RAM) which is primary-volatile memory or Read Only Memory (ROM) which is primary-non-volatile memory.

Figures 4, 7:
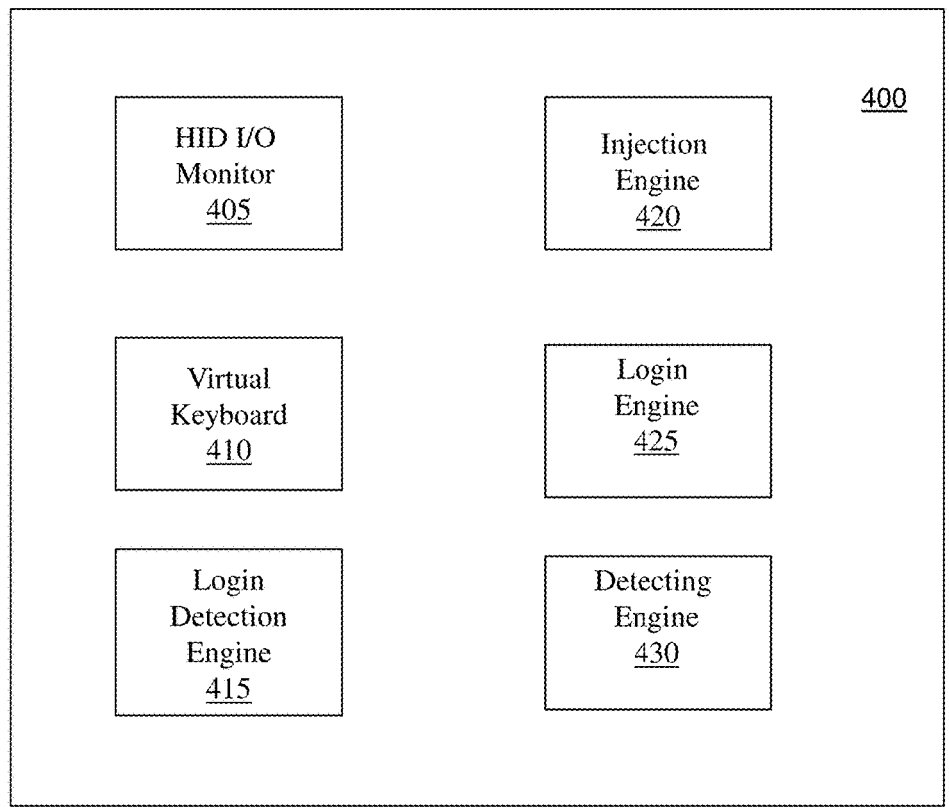
FIG. 4 shows a block diagram of an exemplary environment in accordance with aspects of the invention.
FIG. 7 shows illustrative abstraction layers in accordance with an embodiment of the present invention.

FIG. 4 shows a block diagram of an exemplary environment in accordance with aspects of the invention. In embodiments, the environment may be implemented on a user device 400 or other device accessing a user's account and which comprises the following modules: a HID I/O monitor 405, a Virtual HID Keyboard 410, a login detection engine 415, an injection engine 420, a login engine 425 and a detecting engine 430. The device 400 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Figure 5:
FIG. 5 shows an exemplary login screen in accordance with aspects of the invention.

In FIG. 4, the HID I/O monitor 405 is an engine that monitors keystrokes from a user's keyboard. The Virtual HID Keyboard 410 is a virtual keyboard that provides random keystrokes when the user is typing in a password, for example. In embodiments, the HID I/O monitor 405 monitors keystrokes from the Virtual HID Keyboard 410. The login detection engine 415 detects any login screen. In embodiments, for example, the login detection engine 415 leverages known systems to detect any login screen such as, for example, web applications, applications, etc. These known systems may include leveraging: (i) windows kernels; (ii) monitoring windows calls to windows authentication systems (e.g., LDAP, Kerberos, etc.); (iii) using windows developer tools; and/or (iv) detecting the prompt on web-based applications, e.g., similar to known methods that detect login prompts. An example login screen 500 is shown in FIG. 5, which includes a username field 505, a password field 510 and a "save" prompt 515.

Still referring to FIG. 4, the injection engine 415 will use the virtual HID keyboard 410 to inject random characters into the password. As noted herein, the virtual HID keyboard 410 will be seen by the system as a keyboard and, as such, any application running on the device will not be able to distinguish between the keystrokes from the real keyboard and the virtual HID keyboard 410. Accordingly, any malicious keylogging software will see both keystrokes as coming from the actual keyboard.

Table 1 below shows an illustrative, non-limiting example of a password entered into a login page by the user, e.g., through use of an actual keyboard, and a fake or obfuscated password that is randomly generated by the injection engine 415 and injected into the system and seen by a malicious keylogger software.

TABLE 1

| Keystrokes From Real Keyboard (Password) | Keystrokes From Both Real Keyboard And Virtual Keyboard (Fake or Obfuscated Password) |
|---|---|
| Keystroke = H | Keystroke = H |
| Keystroke = O | Keystroke = Q |
| Keystroke = I | Keystroke = - |
| Keystroke = a | Keystroke = k |
| Keystroke = . | Keystroke = 0 |
| Keystroke = 0 | Keystroke = 5 |
| Keystroke = 1 | Keystroke = l |
|  | Keystroke = 5 |
|  | Keystroke = a |
|  | Keystroke = h |
|  | Keystroke = . |
|  | Keystroke = 0 |
|  | Keystroke = M |
|  | Keystroke = 1 |

As seen from Table 1, above, the injection engine 415 adds characters to the password in order to generate a fake or obfuscated password. In this example use case, the attacker will obtain HQ-k0515ah.0M1 as a password, while the original password is completely different, e.g., HOIa.01. And as should be understood by those of skill in the art, the entropy of the new password is exponentially stronger than the original password due to the additional characters added to the password. In this way, the security has increased, e.g., 12-character password is equivalent to 80 bits of entropy.

As an alternative example use case, the injection engine 415 can delete keystrokes to cause confusion on the attacker. To make it even harder for the attacker, the injection engine 415 will delete keystrokes from the real password as well as inject "fake" or additional keystrokes. This additional embodiment exponentially increases the entropy of the password. An illustrative example is shown in Table 2, below.

TABLE 2

| Keystrokes From Real Keyboard (Password) | Keystrokes From Both Real Keyboard And Virtual Keyboard (Fake or Obfuscated Password) |
|---|---|
| Keystroke = H | Keystroke = H |
| Keystroke = O | Keystroke = Q |
| Keystroke = I | Keystroke = - |
| Keystroke = a | Keystroke = o |
| Keystroke = . | Keystroke = [DELETE} |
| Keystroke = 0 | Keystroke = 5 |
| Keystroke = 1 | Keystroke = l |
|  | Keystroke = 5 |
|  | Keystroke = a |
|  | Keystroke = h |
|  | Keystroke = . |
|  | Keystroke = 0 |
|  | Keystroke = M |
|  | Keystroke = 1 |

It should be understood that any random set of characters can be generated by the injection engine 415 using the virtual keyboard 410. In embodiments, for example, the injection engine 415 may provide any number random characters, spaces, positions, character types and/or number of additional characters. For example, a pseudo code implemented by the injection engine 415 may generate random characters for the fake or obfuscated password as follows:

Injection=
random (character space) number, letter, special characters
Random (position) (1, 2,3, every 2 letter, every odd number of characters)
Random (character type) Lower case, upper case,
Random (amount) 2 characters, 3 characters, progressive (add 1 character, then add 2
characters, then add 3 characters)

FIG. 4 further shows the login engine 425. In embodiments, the login engine 425 records the real password in memory (ignoring the injected fake keystrokes), will gather the password from memory and inject the real password stored in the memory into the login screen, e.g., password field 510 of FIG. 5. The password is entered, e.g., by selecting a login button or save button 515 of FIG. 5. The login engine 425 will also capture the fake or obfuscated password and store the fake or obfuscated password in a secure database, e.g., storage system 34 of FIG. 1. Also, once the password is entered, the login engine 425 will delete the password and all related processes (e.g., login screen) from the system, thereby avoiding risk of exfiltration of the password.

The detecting engine 430 can detect login attempts and compare the entered password to the fake or obfuscated passwords in the secure database. In embodiments, the detecting engine 430 may also be used to store the fake or obfuscated passwords in the secure database. The detecting engine 430 will flag the device as compromised when the entered password matches any of the fake or obfuscated passwords in the secure database. The detecting engine 430 will also execute any of a plurality of security actions including, for example, locking the account, requesting a multifactor authentication and/or sending a message to the owner of the device, the user of the device and/or the administrator of the device.

Figure 6:
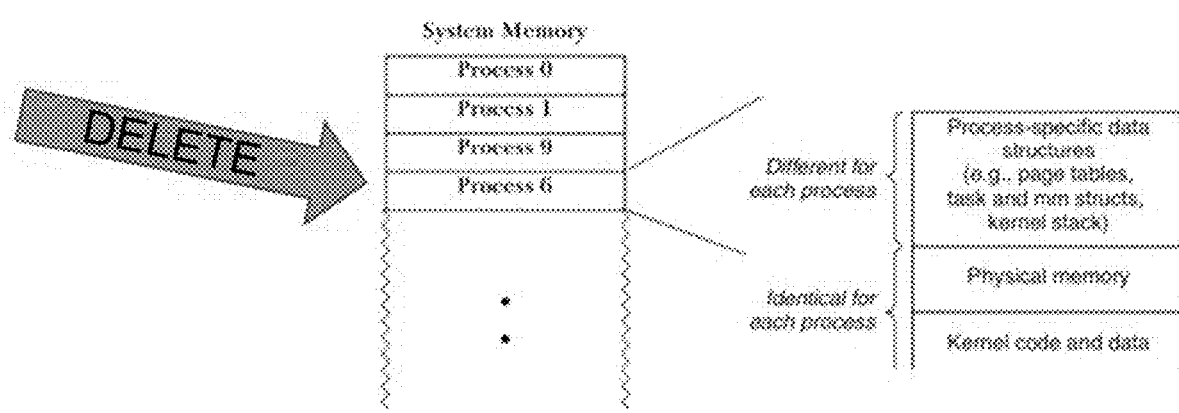
FIG. 6 shows an example of deleting the processes and password from the memory in accordance with aspects of the invention.

FIG. 6 shows an example of deleting the processes and password from the memory. In embodiments, the deleting will ensure that once injected, the password will be completely deleted and thereby impossible to retrieve with any known attack. In this case, "Process 6", which is representative of the login screen, will be completely deleted with the password from memory. The process specific data structures for the deleted process may include, for example, page tables, task and mm structures and a kernel stack. The remaining processes may remain in memory.

FIG. 7 shows illustrative abstraction layers in accordance with an embodiment of the present invention. The abstraction layers include, for example, a hardware layer 700, an operating system layer 705, a driver layer 710 and a software layer 715. As should be understood by those of skill in the art, a malicious keylogging software will be at the software layer 715; whereas the computer program product implementing the system and/or method of the present invention will reside at the operating system layer 705. In this way, the computer program product residing at the operating system layer 705 is at a lower level than the malicious keylogging software. Accordingly, and as should be understood by those of skill in the art, the malicious keylogging software will not be able to detect the computer program product implementing the system and/or method described herein due to the malicious keylogging software being at a higher level.

Figure 8:
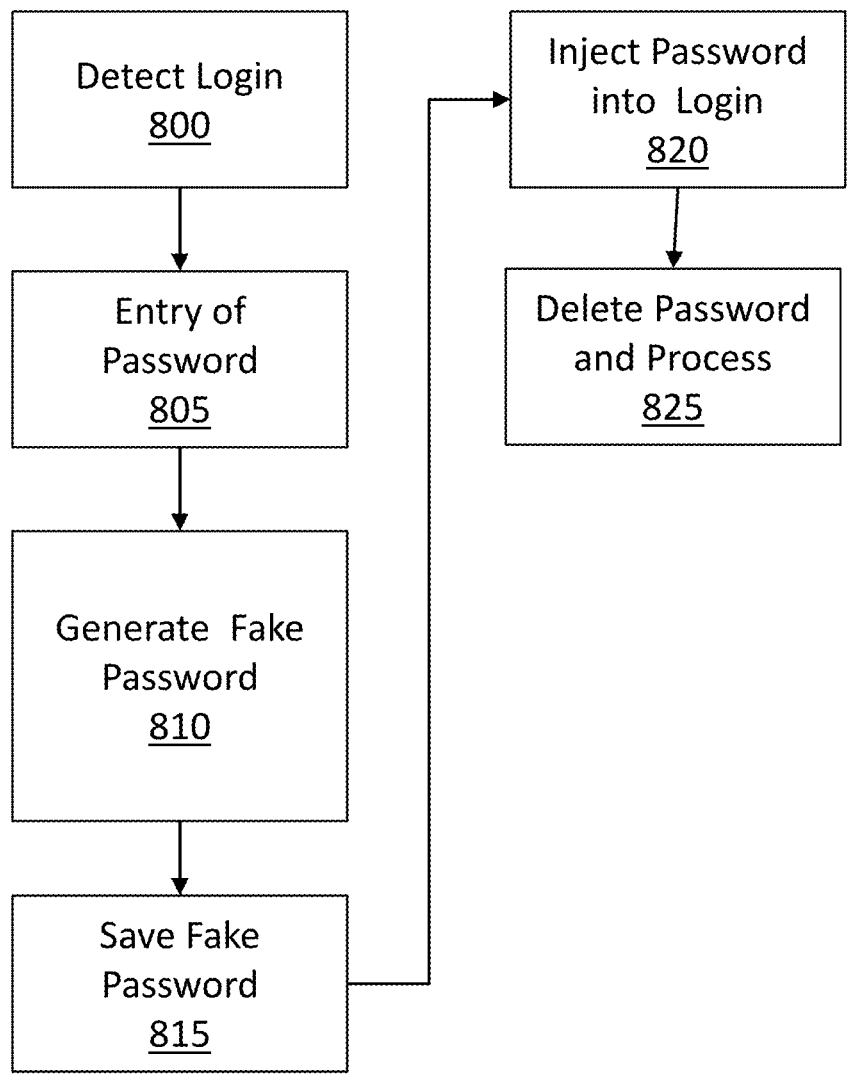
FIGS. 8 and 9 show flowcharts of exemplary methods in accordance with aspects of the invention.
Figure 9:
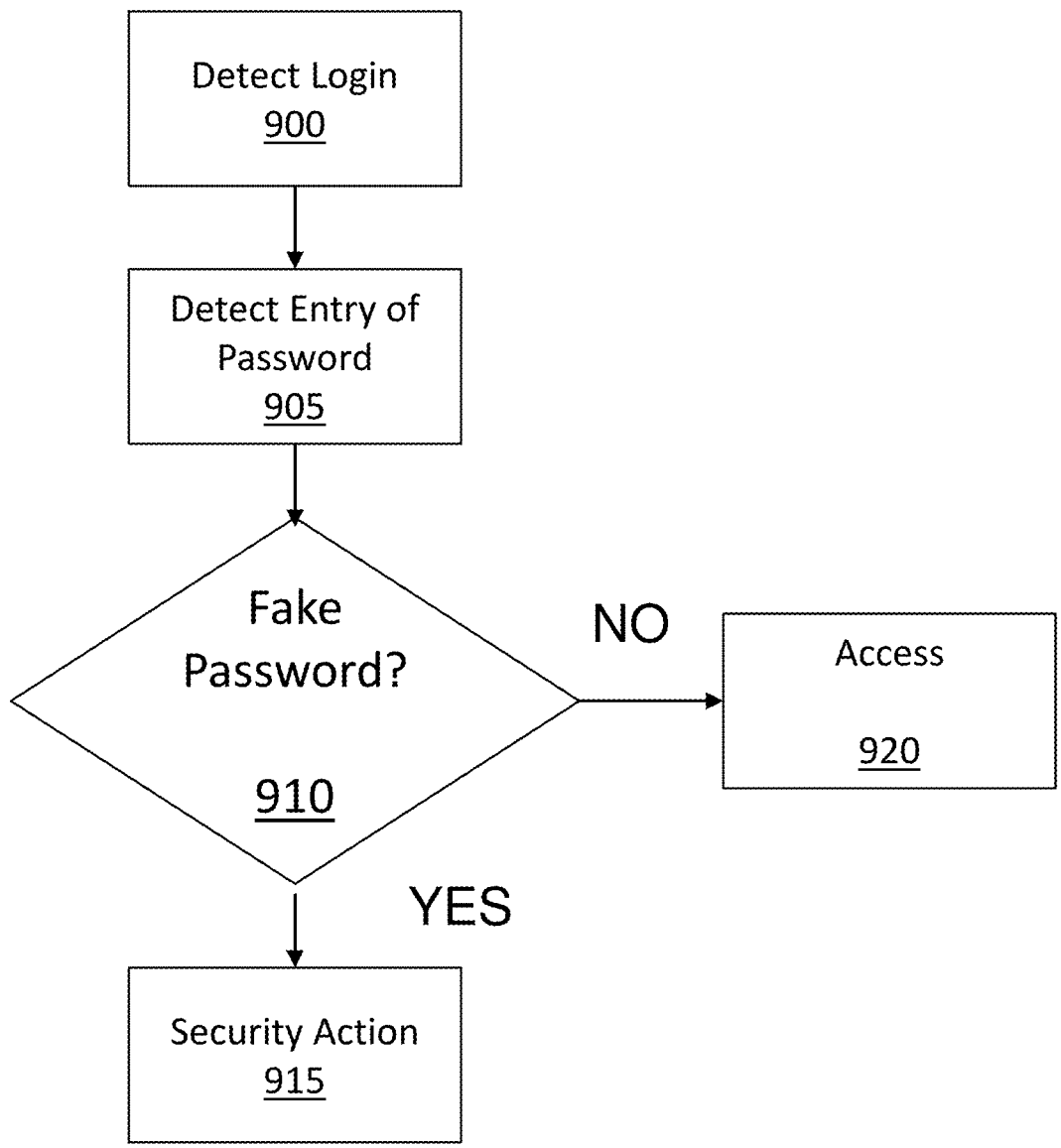

FIGS. 8 and 9 show flowcharts of exemplary methods in accordance with aspects of the invention. Steps of the method may be carried out in the environment of FIG. 4 and are described with reference to elements depicted in FIG. 4. Also, the steps of FIGS. 8 and 9 may be carried out in a different order as shown.

At step 800, the system detects a login screen. At step 805, the system receives a password from the user. As noted already, the login screen can be detected by known processes such as through windows kernels, windows calls to an authentication system, e.g., LDAP, etc., windows development tools or a prompt on a web based application. At step 810, the system generates a fake or obfuscated password (by injecting random characters and/or deleting characters). At step 815, the system saves the fake or obfuscated password in a secure database. At step 820, the password is injected from memory into the login screen. By injecting the password into the login screen and the user acknowledging entry by selecting an enter, save or similar function in the login screen, the user can gain access to their account. At step 825, the password and login process is deleted from the memory. By deleting the password and processes from memory, the hacker or malicious software will not be able to retrieve the actual password.

In FIG. 9, the system detects a login screen as already noted herein. At step 905, the system receives a password from the user. At step 910, the system will compare the password to the fake or obfuscated password stored in the secure database. If there is a match between the entered password and the fake or obfuscated password in the secure database, at step 915, the system will take a security action. The security action may be, for example, locking the system, asking for a multifactor authentication and/or flagging the owner of the account or an administrator. If there is no match, at step 920, the user gains access to the account associated with the password and login screen.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   obtaining, by a computing device, a password entered by an account user;
   placing, by the computing device, the password in memory of a device;
   generating, by the computing device, a fake password by randomly injecting characters into the password when the password is being entered by the account user;
   storing, by the computing device, the fake password in a secure database; and
   deleting the password from the memory.

2. The method of claim 1, further comprising detecting, by the computing device, a login screen and, upon detection, monitoring keystrokes associated with the password and keystrokes from a virtual keyboard which generates the fake password.

3. The method of claim 2, wherein the keystrokes associated with the password are obtained from a physical keyboard and the virtual keyboard provides random keystrokes when the user types the password.

4. The method of claim 3, wherein the virtual keyboard is indistinguishable from the physical keyboard.

5. The method of claim 3, wherein the virtual keyboard injects the random characters into the password to generate the fake password.

6. The method of claim 5, wherein the fake password is generated by deleting characters from the password.

7. The method of claim 1, further comprising deleting processes of the login screen with the password from the memory,
   wherein the fake password is generated at an operating system layer of the device.

8. The method of claim 1, further comprising providing the fake password to a third party.

9. The method of claim 1, further comprising, upon entry of the password into a login screen for the user's account, comparing the password to the fake password stored in the secure database.

10. The method of claim 9, further comprising:
    providing a security action when the password matches the fake password stored in the secure database; and
    flagging the device as compromised.

11. The method of claim 10, wherein the security action comprises requesting a multifactor authentication.

12. The method of claim 1, wherein the computing device includes software provided as a service in a cloud environment.

13. A computer program product comprising one or more computer readable storage media having program instructions collectively stored on the one or more computer readable storage media, the program instructions executable to:
    detect a login screen of a user's account;
    monitor keystrokes of a password entered into the login screen;
    monitor keystrokes of a virtual keyboard;

generate a fake password by randomly injecting the monitored keystrokes of the virtual keyboard into the password when the password is being entered into the login screen;

store the fake password in a secure database;

compare a second password entered into the login screen of the user's account against the fake password; and provide a security action when the second password matches the fake password, wherein the security action comprises requesting a multifactor authentication.

14. The computer program product of claim 13, wherein the security action further comprises:

locking access to the user's account; and flagging the device as compromised.

15. The computer program product of claim 13, wherein a combination of the keystrokes from a physical keyboard and the virtual keyboard generate the fake password.

16. The computer program product of claim 15, wherein the virtual keyboard is indistinguishable from the physical keyboard by a computing device.

17. The computer program product of claim 13, further comprising deleting processes of the login screen with the password from the memory, wherein the fake password is generated at an operating system layer of the device.

18. The computer program product of claim 13, wherein the fake password is generated by deleting characters from the password.

19. A system comprising:

a processor, a computer readable memory, one or more computer readable storage media, and program instructions collectively stored on the one or more computer readable storage media, the program instructions executable to:

monitor keystrokes of a password entered into a login screen of a user's account;

generate a fake password by randomly injecting the keystrokes from a virtual keyboard into the password when the password is being entered into the login screen of the user's account;

store the fake password in a secure database;

compare a second password entered into the login screen of the user's account against the fake password; and provide a security action when the second password matches the fake password.

20. The system of claim 19, further comprising detecting the login screen of a user's account and deleting the password and processes of the login screen upon request to access the user's account.

* * * * *